(No Model.)
R. T. CRANE & G. W. HAYDEN.
QUICK OPENING VALVE.
No. 593,567. Patented Nov. 16, 1897.
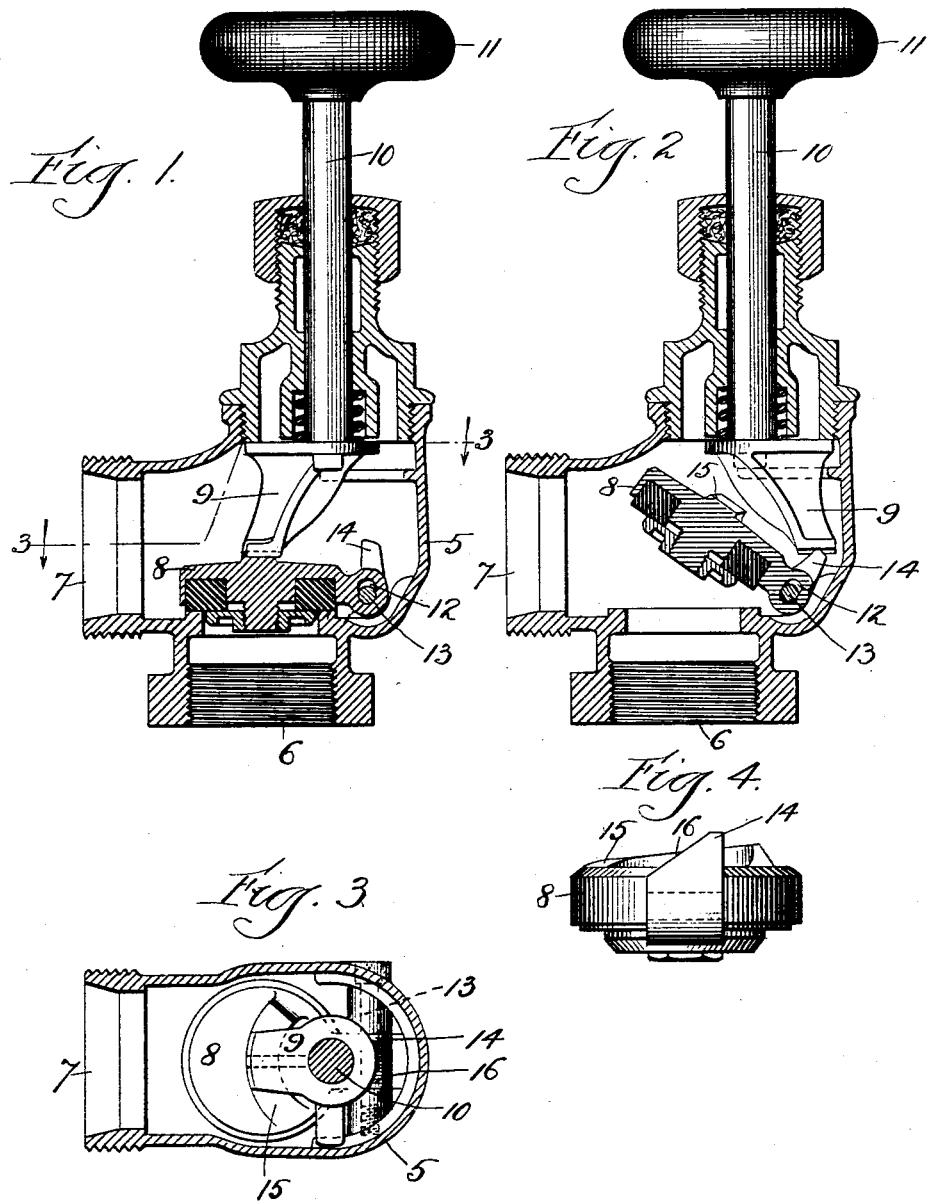
Witnesses
Inventors
Richard T. Crane
George W. Hayden
By Paul Synnestvedt Atty.

UNITED STATES PATENT OFFICE.

RICHARD T. CRANE, OF CHICAGO, AND GEORGE W. HAYDEN, OF OAK PARK, ILLINOIS, ASSIGNORS TO THE CRANE COMPANY, OF CHICAGO, ILLINOIS.

QUICK-OPENING VALVE.

SPECIFICATION forming part of Letters Patent No. 593,567, dated November 16, 1897.

Application filed May 29, 1897. Serial No. 638,823. (No model.)

*To all whom it may concern:*

Be it known that we, RICHARD T. CRANE, residing at Chicago, and GEORGE W. HAYDEN, residing in Oak Park, Cook county, Illinois, citizens of the United States, have invented certain new and useful Improvements in Quick-Opening Valves, of which the following, taken in connection with the accompanying drawings, is a specification.

The object of our invention is to provide a quick-opening valve which will be simple in construction, of slight cost to manufacture, reliable in its operation, and which, when closed, will form a perfectly tight seat.

Our invention will be best understood by referring to the accompanying drawings, in which—

Figure 1 is a vertical section through the center of the valve, showing the valve proper in closed position. Fig. 2 is a vertical section through the center of the valve, showing the valve proper in open position. Fig. 3 is a horizontal section on the line 3 3 of Fig. 1, and Fig. 4 is a view of the valve seat or disk, showing the inclines thereon by which it is operated.

Our invention comprises a body or casing 5, having an inlet-opening 6 and an outlet-opening 7, a connecting-port between the same, a valve 8, controlling said port, and a rotating cam 9, attached to a handle-stem 10. To the stem 10 is fixed a handle 11, of any preferred form, by which the stem and the rotating cam may be operated. The valve 8 is provided with an oblong hole 12, made oblong to compensate for wear, through which passes a pivot-pin 13, which forms the hinge about which the valve turns. Integral with the valve 8 is a projection or tail 14, arranged to be struck by the rotating cam 9 when the handle 11 is turned to open the valve, as shown clearly in Fig. 2. Upon the upper surface of the valve 8 is cast an inclined bearing 15, (see Fig. 4,) against which the rotating cam 9 presses when the valve is in closed position, and upon the upper end of the projection 14 is arranged an inclined plane 16, against which the rotating cam 9 operates when the valve opens.

The form of valve shown in the drawings is what is known as a "composition-seat" disk valve, but a valve having a hard-metal or soft-metal seat could be used, if preferred, the peculiar form or material in the seat of the valve forming no part of our present invention.

If now, supposing the valve to be in closed position, as shown in Fig. 1, it be desired to open it, the handle 11 is turned in the direction in which a right-hand screw is loosened through a half-revolution, when the rotating cam 9 strikes the incline 16 upon the projection 14 and raises the valve 8, as clearly shown in Fig. 2. To close the valve, the handle is turned back to the position shown in Fig. 1 until the rotating cam 9 bears tightly against the incline 15.

Having thus described our invention, what we claim as new, and desire to secure by Letters Patent, is—

In a quick-opening valve, the combination of a casing having a port within the same, a valve controlling said port, a rotating cam constructed with its plane of rotation parallel to the plane of the valve-seat and adapted to bear against the top of said valve to close it, and a projection, or tail, connected to said valve and constructed to open the same by engagement of the rotating cam therewith, substantially as shown and described.

RICHARD T. CRANE.
GEORGE W. HAYDEN.

Witnesses:
L. A. THOMPSON,
PAUL SYNNESTVEDT.